(12) United States Patent
Hathaway

(10) Patent No.: X8835
(45) Date of Patent: May 22, 1835

(54) COMPOSITION, TO PREVENT ABSORPTION OF ANIMALS & FISH OILS

(76) Inventor: Nathaniel Hathaway

Nathaniel Hathaway of Fairhaven, county of Bristol State
of Massachusetts -

Letters Patent

The schedule referred to in these Letters Patent and making
part of the same, containing a description in the words of the said
Nathaniel Hathaway himself of his improvement in a compo-
sition to prevent the absorption of animal and Fish oils by wood

---

Be it known and remembered, that I, Nathaniel Hath-
away of Fairhaven, in the county of Bristol and State of Massa-
chusetts, have discovered a new and useful improvement in a composition
to prevent the absorption of Animal and Fish oils by wood and that
the following is a full and exact description of the same -
Dissolve any given quantity of common glue, say two pounds (by
the usual method of dissolving that article) using as little water as
may be; separate from this have one quarter of a pound of whale
foots, one quarter of a pound of bright varnish and one quarter
of a pound of rosin melted together, when both the glue and this
compound is in a fluid state add them together, stirring them over
a moderate fire, till thoroughly combined, then add and stir into
the whole a sufficient quantity of water to render the composition
of a proper consistency to be laid on easily with a brush while warm
the composition is to be spread over the surface of the wood and left
to dry and when dry is completely impervious to animal or fish oil
in some instances glue alone has been applied by me for the same
purpose and is found to produce the desired effect and the afore -
named additional ingredients have been added to render its use
and application more easy as the composition will continue longer
in a limpid state than glue alone, the proportions of these ingre-
dients have also in some instances been changed. It is particularly
useful to be applied to cask intended to be filled with oil, machinery
to be used in and about Oil Manufactories and other apparatus in the
operation of which oil is used - I claim as my discovery the application of glue to prevent the absorption of animal and fish oil by wood; Whether used alone or combined with the other ingredients aforenamed, and whether those ingredients are used in the proportions set forth, or in other and different proportions.

Witnesses:
Thos. N. Allen
Chas. Rumsell

Nathan P. Hathaway

Ex d
WGL 442 wd